(12) United States Patent
Chen

(10) Patent No.: US 8,665,385 B2
(45) Date of Patent: Mar. 4, 2014

(54) CAPACITIVE COUPLED NON-VOLATILE ELECTRONIC DISPLAY

(76) Inventor: Shu-Lu Chen, Taipei (TW)

( * ) Notice: Subject to any disclaimer, the term of this patent is extended or adjusted under 35 U.S.C. 154(b) by 384 days.

(21) Appl. No.: 13/274,193

(22) Filed: Oct. 14, 2011

(65) Prior Publication Data

US 2012/0092575 A1 Apr. 19, 2012

Related U.S. Application Data

(60) Provisional application No. 61/393,505, filed on Oct. 15, 2010.

(51) Int. Cl.
*G02F 1/1343* (2006.01)

(52) U.S. Cl.
USPC .................. 349/38; 349/19; 349/33; 349/34; 349/39

(58) Field of Classification Search
USPC ...................... 349/19, 33, 34, 38, 39
See application file for complete search history.

(56) References Cited

U.S. PATENT DOCUMENTS 7,911,844 B2 * 3/2011 Nakamura et al. ........ 365/185.17
8,472,264 B2 * 6/2013 Sato .......................... 365/189.06

* cited by examiner

*Primary Examiner* — Jennifer Doan
(74) *Attorney, Agent, or Firm* — Chun-Ming Shih; HDLS IPR Services

(57) ABSTRACT

A non-volatile electronic display includes a light valve plate comprising a plurality of liquid crystal cells on a transparent substrate; a plurality of "floating/storage" nodes functioning like non-volatile memories formed on the transparent substrate and corresponding to the liquid crystal cells, and a plurality of word lines and a plurality of bit lines connected to the plurality of non-volatile memories and supplying signal to store charge to at least one non-volatile memory. The charge is retained in the at least one "floating/storage" nodes functioning like non-volatile memory for a predetermined period when no external power is applied to the non-volatile electronic display.

20 Claims, 8 Drawing Sheets

CAPACITIVE COUPLED NON-VOLATILE ELECTRONIC DISPLAY

CROSS-REFERENCE TO RELATED APPLICATIONS

This application claims priority benefit of U.S. Provisional Patent Application No. 61/393,505, filed on Oct. 15, 2010 and entitled "Capacitive Coupled Non-volatile Electronic Display-Electronic Painting," which is hereby incorporated herein by reference.

BACKGROUND OF THE INVENTION

1. Field of the Invention

The present invention relates to an electronic display, and more particularly to a capacitive coupled non-volatile electronic display for field controllable light transmissible material such as liquid crystal.

2. Description of the Related Art

With great advance in the fabricating techniques of optoelectronics and semiconductor devices, flat panel displays (FPDs) have been substantially developed. Among the FPDs, a liquid crystal display (LCD) has become the mainstream display product due to space utilization efficiency and low power consumption. The LCD includes an LCD panel and a backlight module in most cases. Since the LCD panel cannot emit light, the backlight module disposed underneath the LCD panel is required to function as a planar light source.

Please refer to FIG. 1A, which is a schematic diagram of a conventional thin film transistor (TFT) LCD device. The LCD device includes an LCD panel 100a, a gate driving circuit (scan driving circuit) 40a for driving the word line WL, a source driving circuit (data driving circuit) 42a for driving the bit line BL. The LCD panel 100a includes two substrates (not shown) and liquid crystal molecules filled between these two substrates. With reference to FIG. 1A, one substrate (such as a lower substrate) is disposed with a plurality of word lines WL, a plurality of bit lines BL perpendicular to the word lines WL, and a plurality of thin film transistors (TFTs) 20a. Each of the TFTs 20a has a gate electrically connected to the corresponding word line WL, a source electrically connected to the corresponding bit line BL and a drain electrically connected to the corresponding liquid crystal cell 10a. The other substrate (such as an upper substrate) is disposed with a common electrode for providing a common voltage or connected to ground. By supplying scan control signals through the word lines WL and data signals through the bit lines BL, the TFTs 20a can be turned on/off to control gray level status of the corresponding pixel.

For the sake of simplicity, only four TFTs 20a are shown in FIG. 1A, but in practical, there are more TFTs 20a arranged in matrix fashion and each TFT 20a is corresponding to a pixel or a sub pixel. Besides, the circuit characteristics of the liquid crystal cell 10a between two substrates of the LCD panel can be treated as an equivalent capacitor.

However, in the above-demonstrated TFT LCD device, it still needs power to show image, and periodical refresh is also required. Besides, when power is disconnected, the image disappears due to the loss of electrical field across the liquid crystal. This volatile characteristic is very similar to the so-call volatile memory such as DRAM.

FIG. 1B shows the equivalent circuit of TFT 20a for driving a liquid crystal cell 10a, where the liquid crystal cell 10a is treated as an equivalent capacitor. As shown in FIG. 1B, signals sent through word line WL and bit line BL can control the TFT 20a to switching on and off to provide the electrical field across the liquid crystal cell 10a. As DRAM, the implementation in FIG. 1B is volatile and the data in this capacitance is leaky. The stored electrons can leak through the transistor 20a or even get recombined in the semiconductor region. Therefore, the display with light valve such as liquid crystal has the drawbacks of frequent signal refreshing and constant power requirement.

SUMMARY OF THE INVENTION

It is an object of the present invention to provide a non-volatile or SRAM version compared to the current DRAM version of electronic displays. The present invention is aimed to improve the retention time of the electrical field across liquid crystal by introducing a "floating node" which can more effectively preserve electrical charges.

Accordingly, the present invention provides a non-volatile electronic display, comprising: a liquid crystal plate comprising a plurality of liquid crystal cells arranged in matrix fashion; a plurality of non-volatile memories, or floating nodes where charges can be stored within dielectric layers for long retention time. Each of the non-volatile memories, or the floating node, is arranged corresponding to one liquid crystal cell; a plurality of word lines and a plurality of bit lines connected to the plurality of non-volatile memories and supplying signal to store charge to at least one non-volatile memory; wherein charge is retained in the at least one non-volatile memory for a predetermined period when no external power is applied to the at least one non-volatile memory.

BRIEF DESCRIPTION OF THE DRAWINGS

The present invention will be readily understood by the following detailed descriptions in conjunction with the accompanying drawings, wherein like reference numerals designate like structural elements, and in which.

DETAILED DESCRIPTION OF THE INVENTION

Figure 1A:
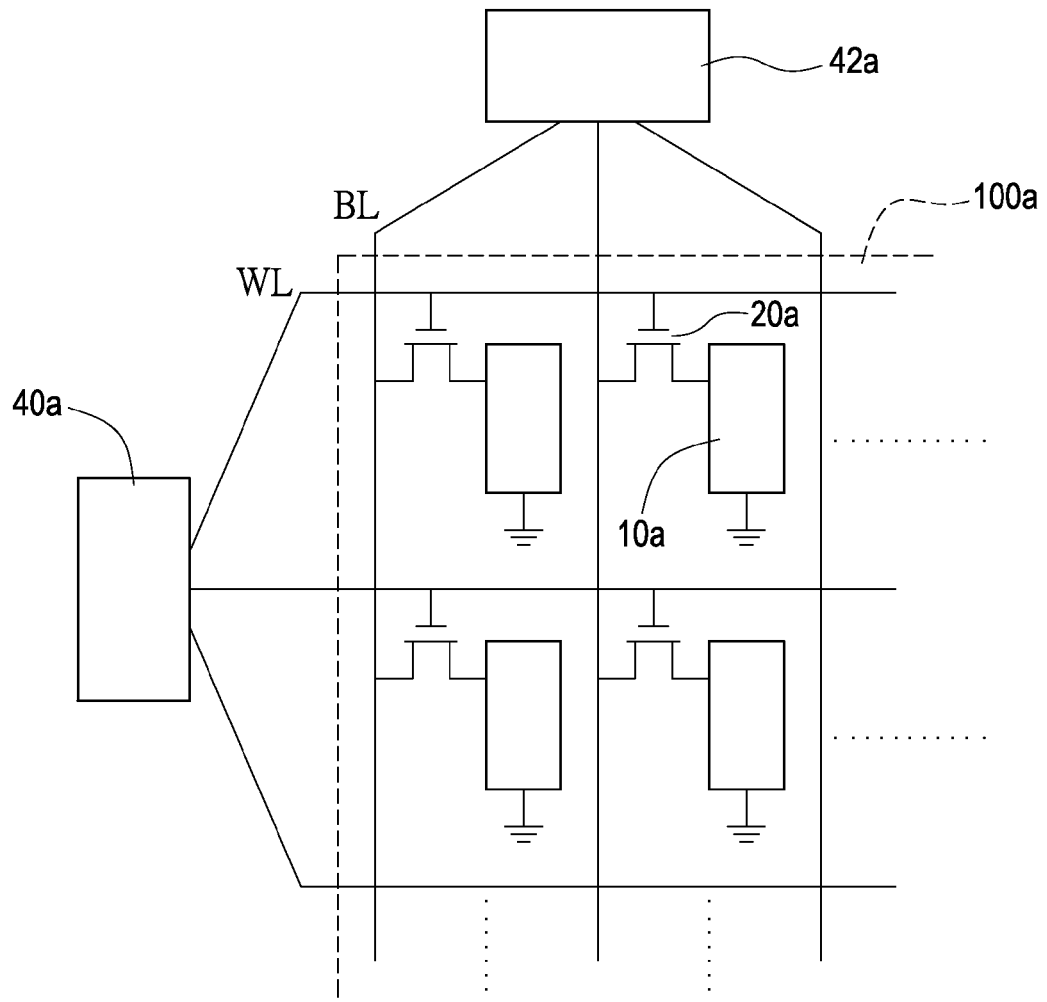
FIG. 1A is a schematic diagram of a conventional thin film transistor (TFT) LCD device.
Figure 1B:
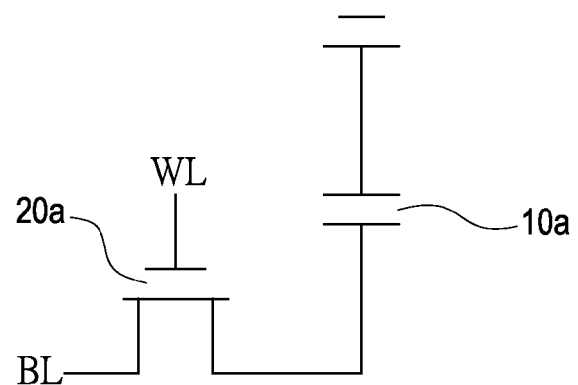
FIG. 1B shows the equivalent circuit of TFT for driving a liquid crystal cell.
Figure 2A:
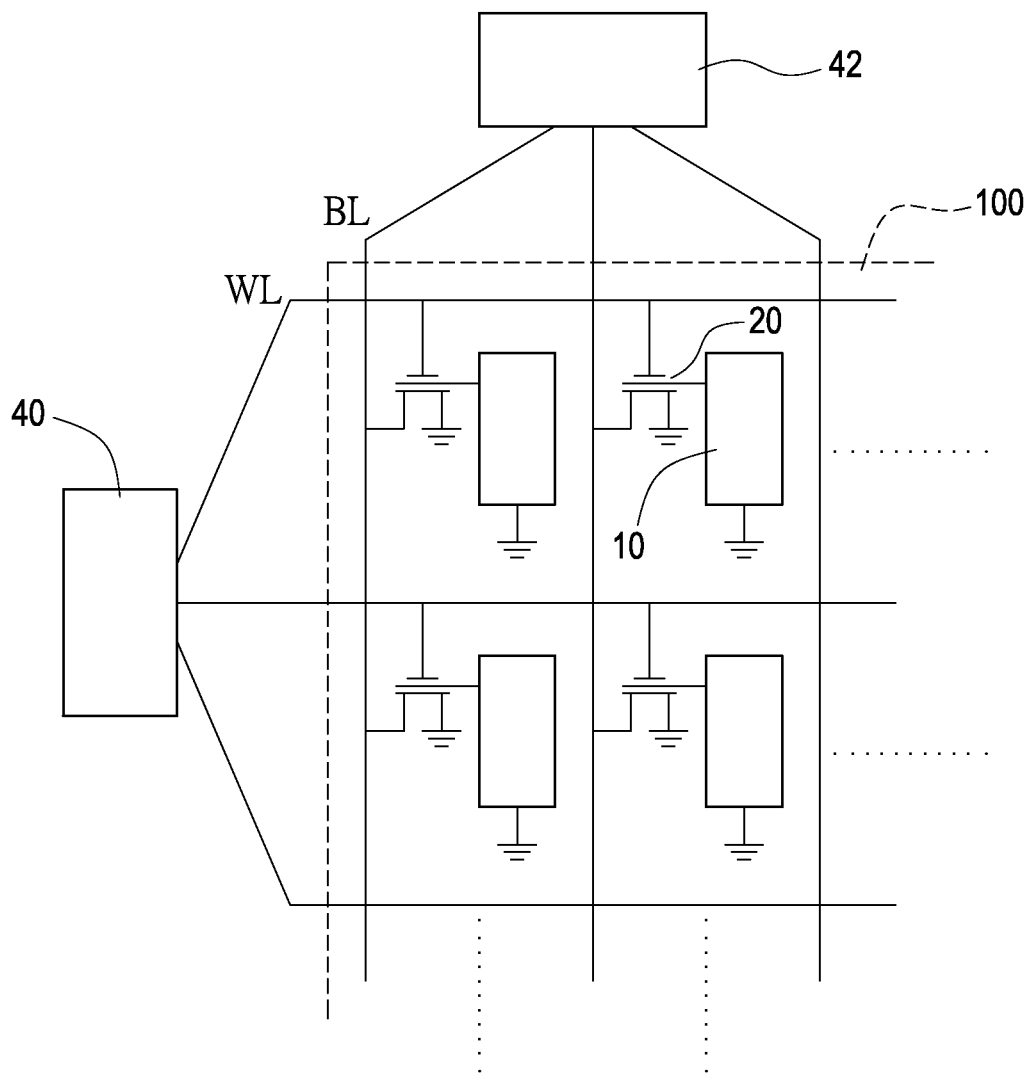
FIG. 2A shows a schematic diagram of the non-volatile electronic display according to one preferred embodiment of the present invention.
Figure 2B:
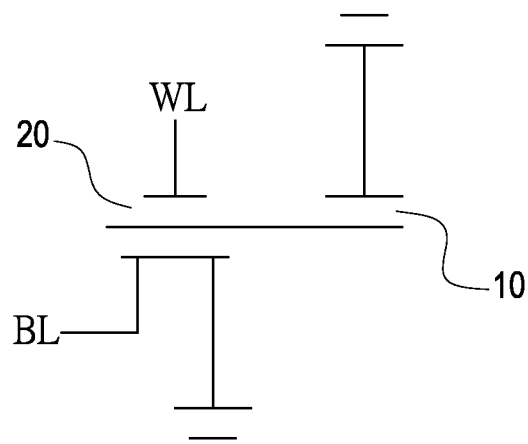
FIG. 2B shows the equivalent circuit for one pixel of the non-volatile electronic display in FIG. 2A.

FIG. 2A shows a schematic diagram of the non-volatile electronic display according to one preferred embodiment of the present invention, and FIG. 2B shows the equivalent circuit for one pixel of the non-volatile electronic display. In FIG. 2A, the thin film transistor (TFT) shown in FIG. 1A is replaced by one non-volatile memory 20 such as a flash memory 20 with a floating gate or nano-crystal inside the dielectric to store data. As demonstrated, the flash memory cell 20 can hold data for years inside its floating gate or individual nano-crystal, so this capacitance shown in FIG. 2B is not leaky and the data can be stored much longer to reduce the frequency or eliminate the periodically refresh. In other words, if we call the previous LCD the DRAM version of display, this invention is the SRAM version of even the non-volatile version of display. With reference again to FIGS. 2A and 2B, the non-volatile electronic display of the present invention mainly comprises a light valve panel, which is made of field controllable light transmissible material such as liquid crystal, a gate driving circuit 40 for driving the word line WL, a source driving circuit 42 for driving the bit line BL. The non-volatile electronic display further comprises a plurality of non-volatile memories 20. According to one preferred embodiment, the non-volatile memory 20 are flash memory with its (control) gate electrically connected to the word line WL, source electrically connected to bit line BL, drain electrically connected to ground, and floating gate electrically connected to one corresponding liquid crystal cell 10. The non-volatile memories 20 are preferably fabricated on the lower supporting substrate 100 (or upper supporting substrate) of the non-volatile electronic display, where the lower supporting substrate 100 can be glass or insulator. By supplying control signals from the word lines WL and the bit lines BL, the display content of the non-volatile electronic display can be changed. More particularly, when electric charge is stored in the floating gate of the non-volatile memory 20, electric field associated with the electric charge is applied through the corresponding liquid crystal cell 10 to polarize the liquid crystal cell 10. In this way, the gray levels of the liquid crystal cells 10 can be controlled to display desired image for the non-volatile electronic display. Even external power is cut off from the non-volatile electronic display, the stored charge is preserved in the floating gate for long time, and the non-volatile electronic display can still display the original image.

Figure 3A:
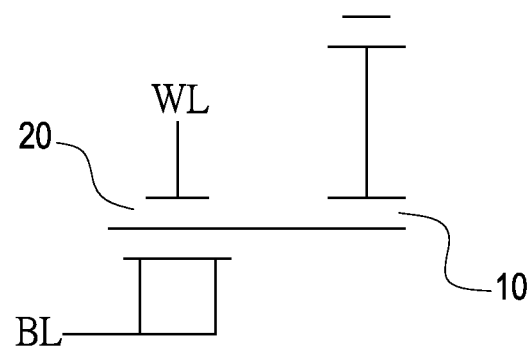
FIGS. 3A-3C shows other equivalent circuit diagrams for this invention.
Figure 3B:
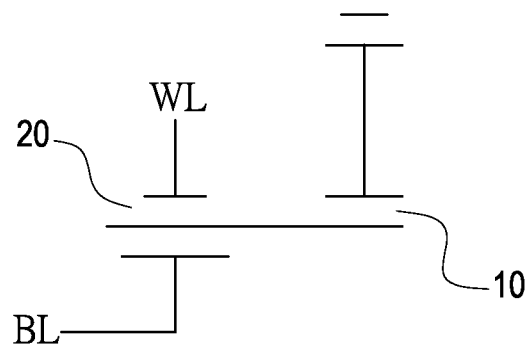
Figure 3C:
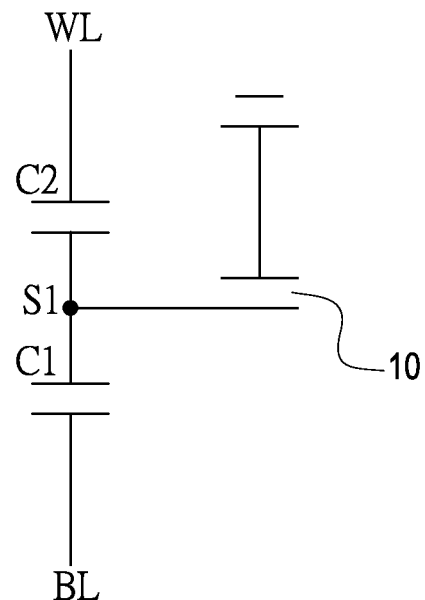

FIGS. 3A and 3B shows other equivalent circuit diagrams for this invention, where the source and drain of the non-volatile memory 20 are electrically connected to bit line BL and the control gate of the non-volatile memory 20 is electrically connected to word line WL, while the floating gate of the non-volatile memory 20 is electrically connected to the liquid crystal cell 10, which is equivalent to a capacitor. Moreover, we can further simplify the design by using cross-coupled two metal lines to form a storage node as shown in FIG. 3C. This can be viewed as a capacitance divider and the voltage in between the two series connected capacitance C1 and C2 is used to provide the electrical field necessary to polarize the liquid crystal cell 10. After control signals are supplied through word line WL and bit line BL, charges can be selectively stored in the floating gate of the non-volatile memory 20, which is equivalent to two capacitors C1 and C2 in series. Even though external power is no longer supplied to the non-volatile electronic display of the present invention, the electric field originally provided by the two capacitors C1 and C2 is now stored in the form of static electrical charges in the floating node (S1) between C1 and C2 to keep polarizing the liquid crystal cell 10 to manipulate either the incoming or reflecting light. Therefore, the invention can then be used as an "electrical painting" since it doesn't need power to display image as long as a mirror is provided on the bottom to reflect the external incoming light. This invention can also display image for small power consumption if efficient light source such as LED backlight is provided at the backside of the non-volatile electronic display of the present invention. In both cases (reflected mirror or LED backlight), the periodical refreshment can be reduced in frequency or even eliminated.

FIGS. 4A to 4D depict block diagrams for other preferred embodiments of the present invention, where both sides of the liquid crystal cell are provides with floating terminals (floating gates). This implantation can display image by liquid crystal cell with reduced need for periodical refreshment. In this implementation, the light source can be provided by a reflecting light source from the external environment, or a compact LED backlight.

For example, we can bias in a scheme that $V_{BL1}>V_{WL1}>V_{WL2}>V_{BL2}$ for the setting operation. The voltage $V_{SL}$ will be larger than $V_{SU}$ due to the capacitive coupling and this bias provides the electrical field to rotate the liquid crystal cell 10. This electrical field can be preserved as a static electrical field from the floating nodes even when the external power is turned-off Similarly, this invention can then be used as an "electrical painting" since it could potentially display image by just using the external light source.

Figure 5A:
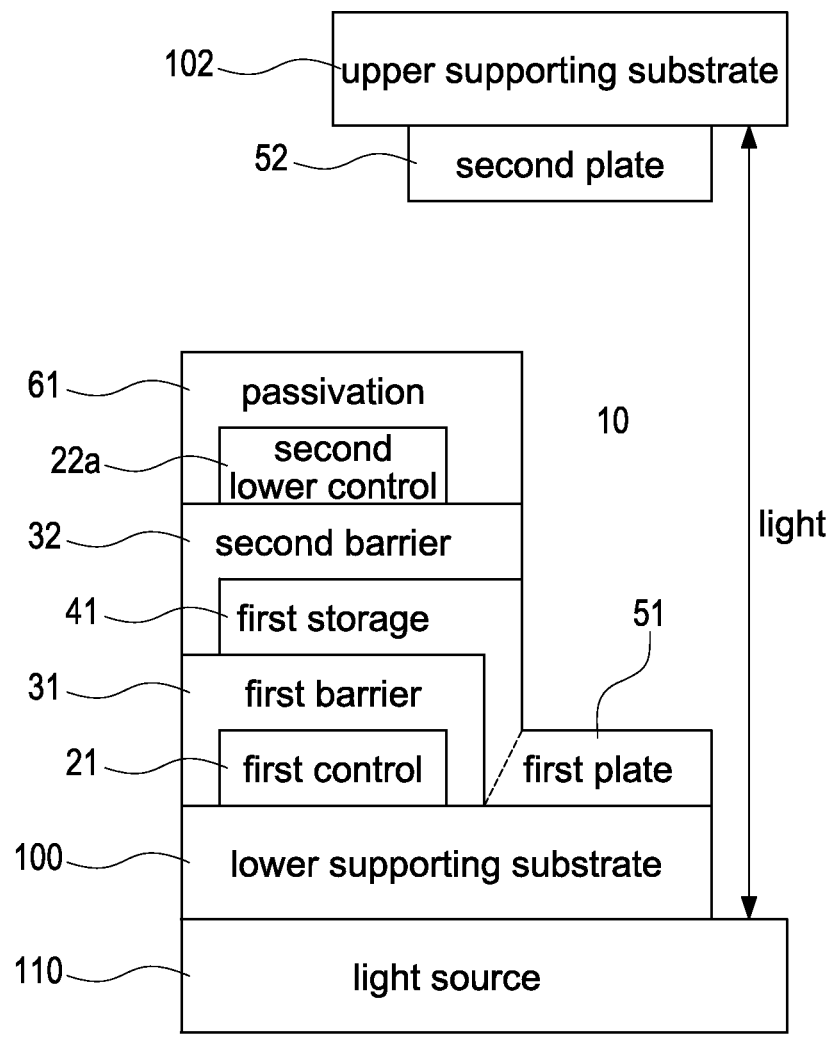
FIG. 5A shows a schematic diagram for the device level implementation of the non-volatile electronic display shown in FIG. 3A
Figure 5B:
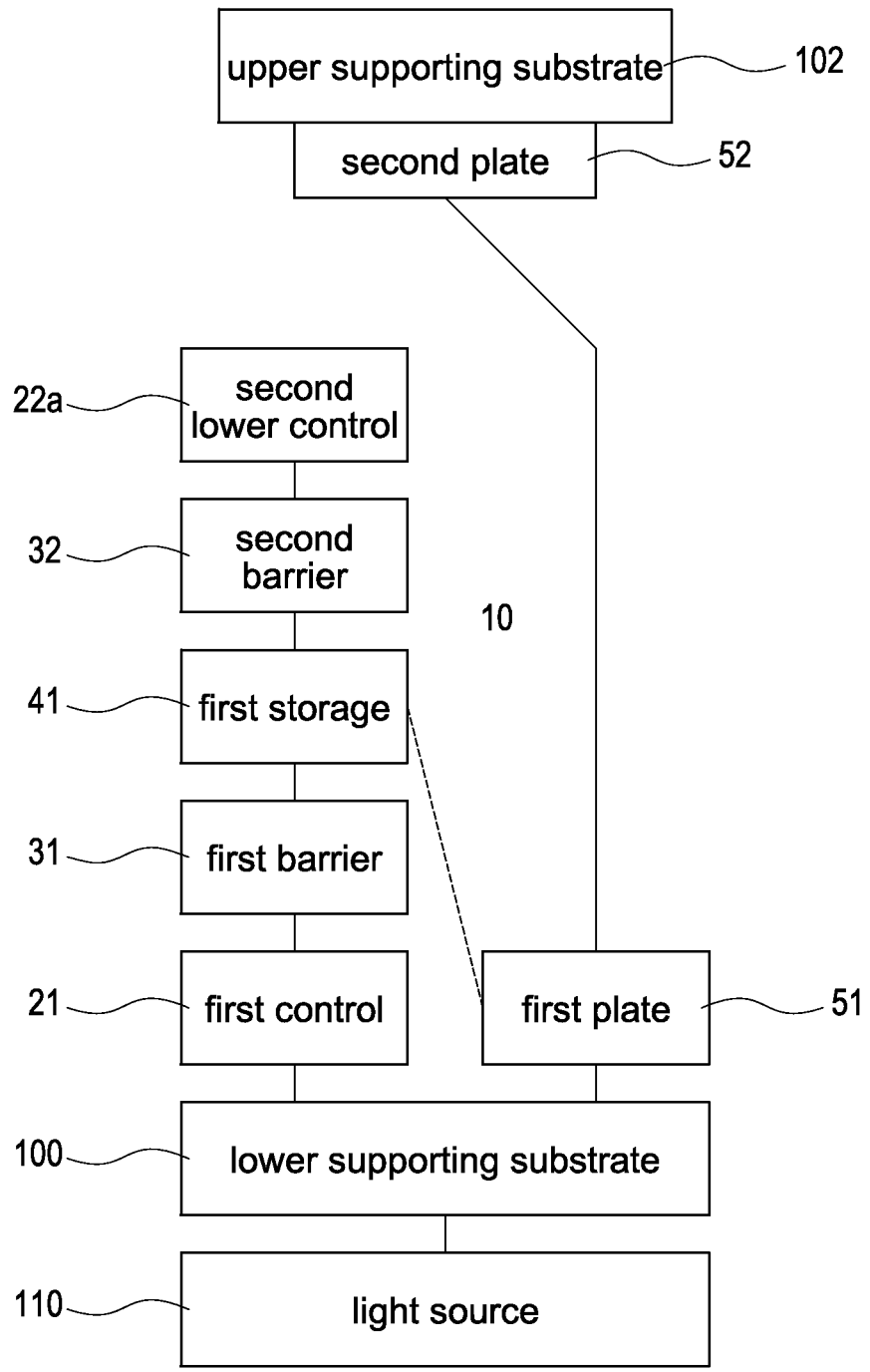
FIG. 5B is block diagram for FIG. 5A.

FIG. 5A shows a schematic diagram for the device level implementation of the non-volatile electronic display shown in FIG. 3A and FIG. 5B is block diagram for FIG. 5A. As shown in FIG. 5A, the non-volatile electronic display of the present invention comprises a lower supporting substrate 100, an upper supporting substrate 102, liquid crystal cells 10 sandwiched between the lower supporting substrate 100 and the upper supporting substrate 102, and optionally a backlight source 110 or a mirror (light reflective layer) on the outer face of lower supporting substrate 100. The non-volatile electronic display of the present invention further comprises a first barrier layer 31 formed in adjacent to the lower supporting substrate 100 (for example, the first barrier layer 31 is formed atop the lower supporting substrate 100 in this drawing, but this specific orientation is not limit of the present invention), a first control electrode (control 1) 21 at least partially encapsulated by the first barrier layer 31, a second barrier layer 32 in adjacent to the first barrier layer 31, a first storage 41 at least partially encapsulated by the second barrier layer 32, a passivation layer 61 formed to cover part of the second barrier layer 32, a second lower control electrode (control 2a) 22a at least partially encapsulated by in the passivation layer 61, and a first plate 51 partially with electrical-connection to first storage 41 and partially connected to the liquid crystal cell 10. Moreover, the non-volatile electronic display of the present invention further comprises a second plate 52 formed on the inner face of the upper supporting substrate 102.

In the above arrangement, the first control electrode (control 1) 21 and the second lower control electrode (control 2a) 22a can be aluminum (Al) or other metals. The first barrier layer 31 and the second barrier layer 32 can be oxide or other insulators. To get better data retention time, the film quality of both barriers is important. Since the process temperature for devices on glass substrate has to be low, low temperature plasma-enhanced oxidation tool/technique, which has just recently been developed, or chemical vapor deposition (CVD) process could be used to provide high quality insulation layer to maintain the electrical charges inside the floating node (first storage 41). The first storage 41 can be Al, transparent conductive material such as indium tin oxide (ITO), nano-crystals or other metals, whichever can serve as the function to store charges sandwiched between barrier layers. The first plate 51 can be transparent conductive material such as ITO. The second plate 52 can be transparent conductive material such as ITO, or simply a ground contact. The passivation layer 61 can be oxide, nitride or other insulator.

With reference again to FIG. 5A, in the non-volatile electronic display of the present invention, at least one electrical plate 51 provides electrical field to the liquid crystal cell 10, which functions as a field controllable light transmissible unit for the non-volatile electronic display. At least one control electrode 21 or 22a charges or discharges the electrical plate 51. At least one dielectric layer (namely, the first barrier layer 31 or the second barrier layer 32) separates the control electrode 21 (or 22a) with the electrical plate, 51. The dielectric layer 31 (or 32) has higher intrinsic energy band gap at room temperature than the intrinsic energy band gap of either materials used for the electrical plate 51 and the control electrode 21 (or 22a). Moreover, in the structure shown in FIG. 5A, there is neither semiconductor nor metal directly connecting the control electrode 21 (or 22a) and the electrical plate 51. Any electrical charging or discharging function that the control electrode 21 (or 22a) performs to the electrical plate 51 is through at least one dielectric layer 31 (or 32).

The part of the non-volatile electronic display shown in FIG. 5A is connected to gate driver (not shown) and source driver (not shown) through word line WL and bit line BL respectively, which are connected to second lower control electrode (control 2a) 22a and the first control electrode (control 1) 21 respectively. By biasing the voltage of the first control electrode 21 to be larger than the voltage of the second lower control electrode 22a (V21>V22a, namely, V(control 1)>V(control 2a)), the electron can tunnel through the second barrier layer 32 from second lower control electrode (control 2a) 22a to the first storage 41/first plate 51 and get trapped there once the above bias is removed. Those electrons set the potential of the first plate 51 and provides electrical field between the first plate 51 and the second plate 52. Therefore, electric field can be supplied to the liquid crystal cell 10 to sustain the displayed image, even the external powers or signals are no longer applied to the non-volatile electronic display of the present invention. Moreover, to reset the image, suitable bias, such as V22a>V21, can be applied to de-trap those electrons from the first storage 41/first plate 51 through the first barrier layer 31 to the first control electrode (control 1) 21. The detailed setting/resetting mechanism can be varied, but capacitive-coupled idea should be remained.

Note that here we use such biasing scheme and electron tunneling as examples while other similar bias scheme modification (ex: V(control 1)<V(control 2a)) or using hole tunneling should become obvious after reading this disclosure for people who skilled in this art. The non-volatile electronic display of the present invention can be used as an "electrical painting" without power consumption if a mirror (light reflective layer) is formed on the outer face of lower supporting substrate 100. Moreover, the non-volatile electronic display of the present invention can be used as an "electrical painting" with minimal power consumption and without the frequently refreshing requirement if an LED backlight source 110 is provided on the outer face of lower supporting substrate 100.

Figure 4A:
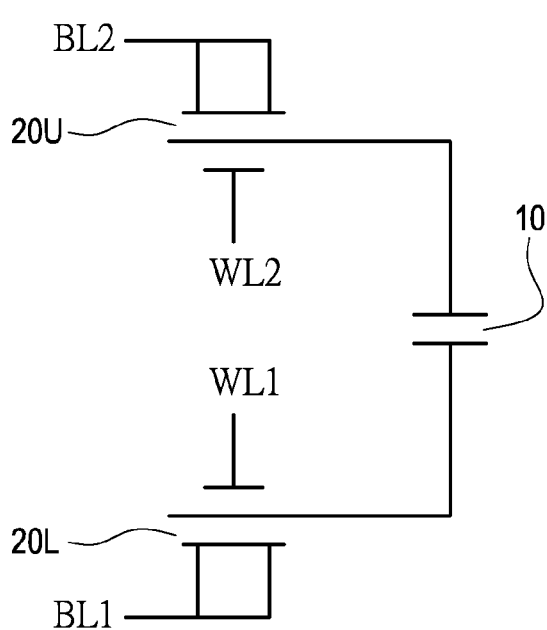
FIGS. 4A to 4D depicts block diagram for other preferred embodiments of the present invention.
Figure 4B:
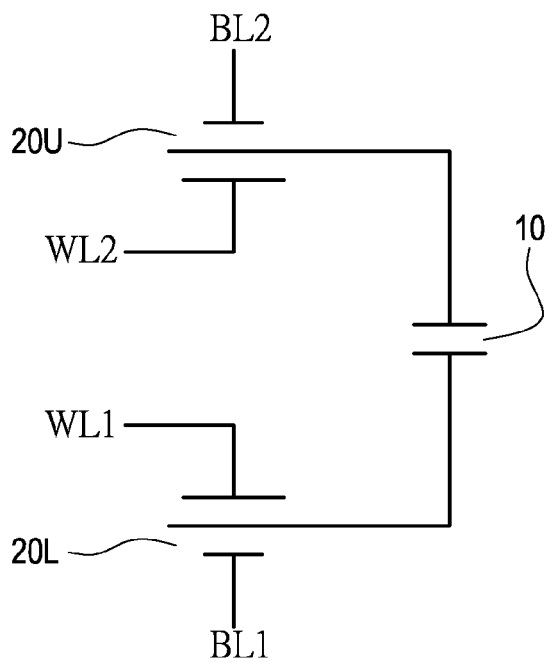
Figure 4C:
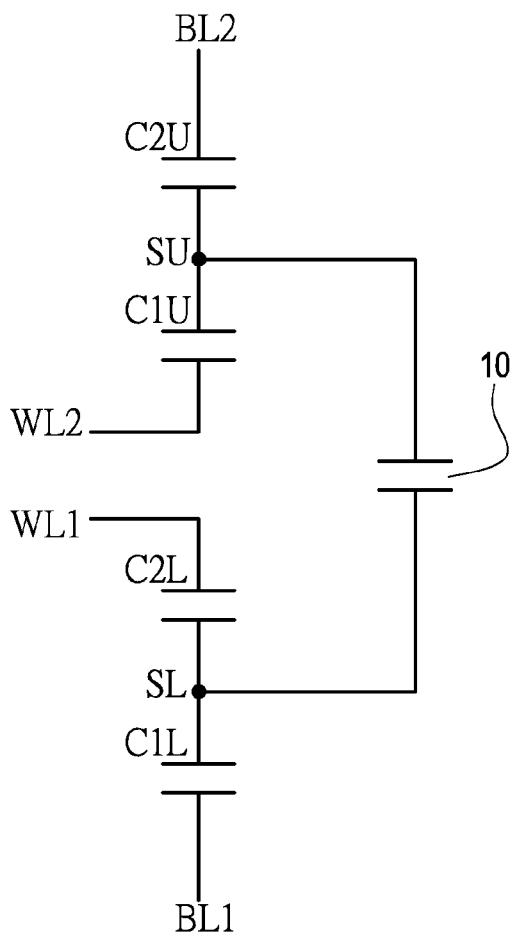
Figure 4D:
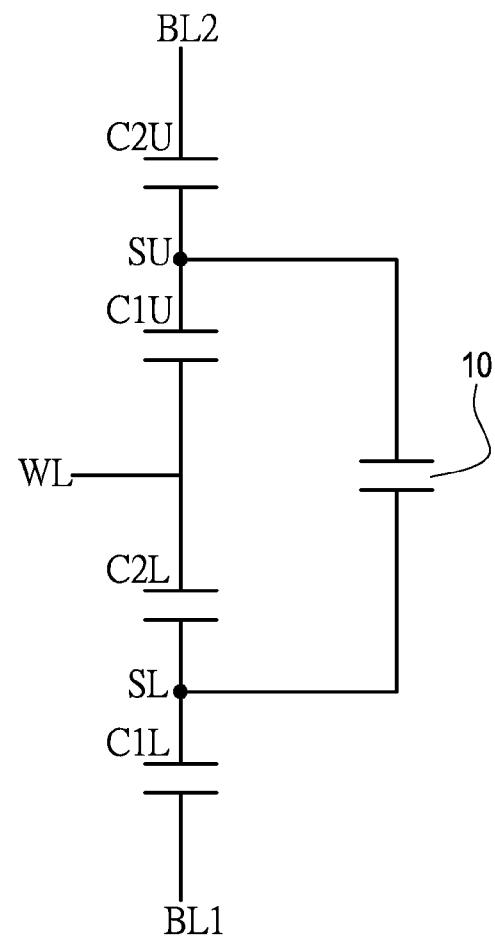
Figure 6A:
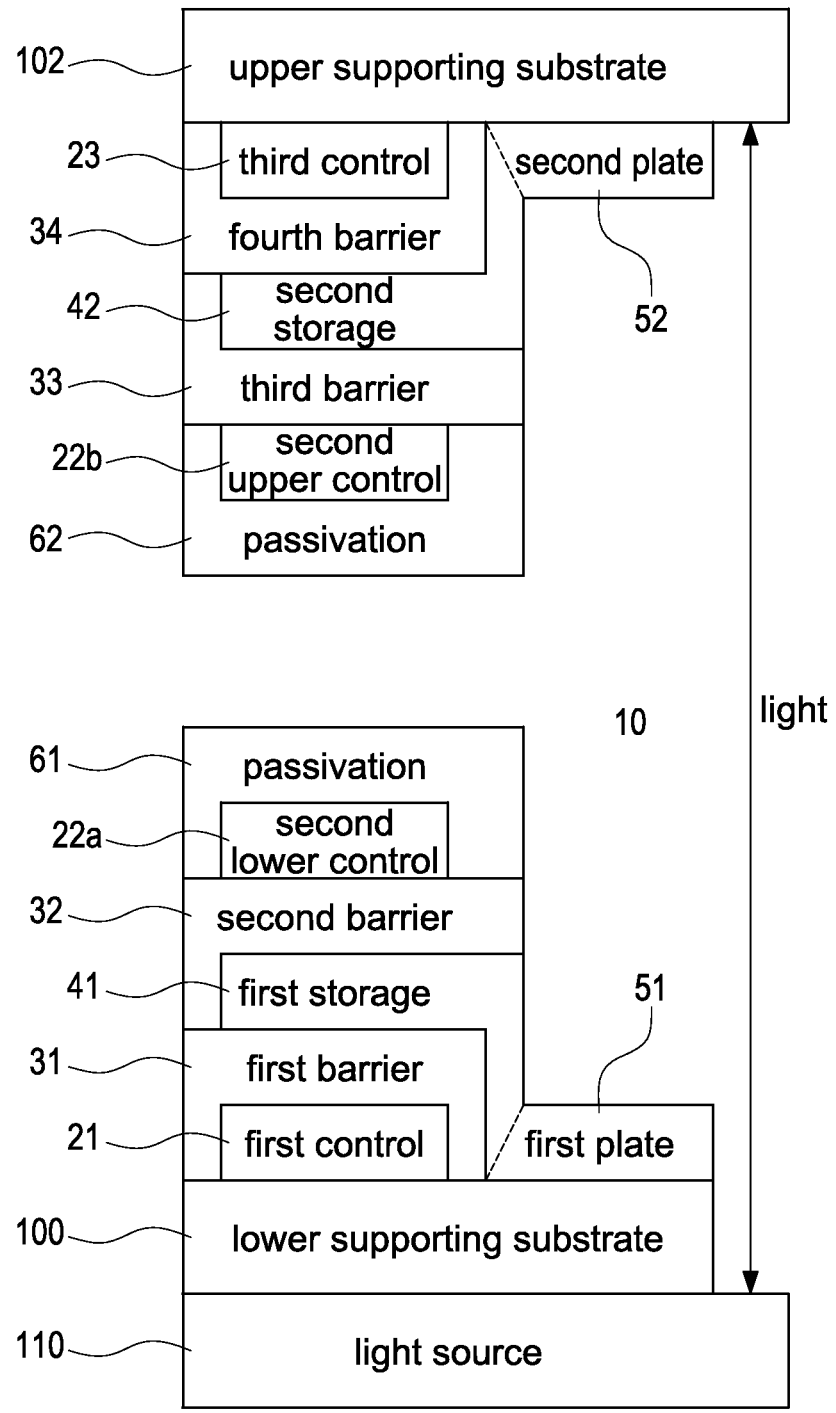
FIG. 6A shows a schematic diagram for the device level implementation of the non-volatile electronic display shown in FIG. 4A
Figure 6B:
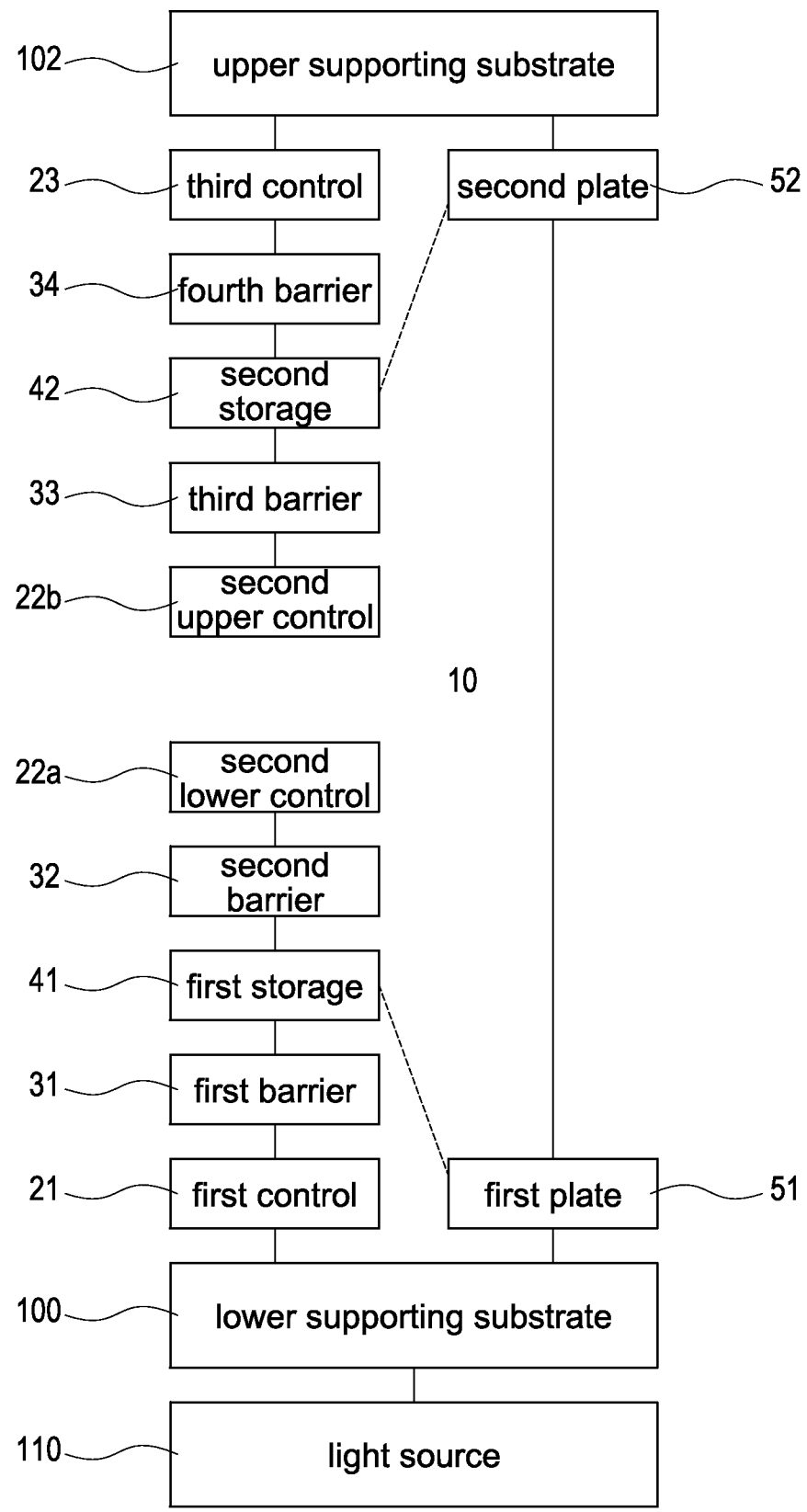
FIG. 6B is block diagram for FIG. 6A.

FIG. 6A shows a schematic diagram for the device level implementation of the non-volatile electronic display shown in FIG. 4A and FIG. 6B is block diagram for FIG. 6A. As shown in FIG. 6A, the non-volatile electronic display of the present invention comprises a lower supporting substrate 100, an upper supporting substrate 102, liquid crystal cells 10 sandwiched between the lower supporting substrate 100 and the upper supporting substrate 102 and optionally a backlight source 110 or a mirror (light reflective layer) on the outer face of lower supporting substrate 100. The non-volatile electronic display of the present invention further comprises a first barrier layer 31 formed in adjacent to the lower supporting substrate 100, a first control electrode (control 1) 21 at least partially encapsulated by the first barrier layer 31, a second barrier layer 32 formed in adjacent to the first barrier layer 31, a first storage 41 at least partially encapsulated by the second barrier layer 32, a passivation layer 61 formed to cover the second barrier layer 32, a second lower control electrode (control 2a) 22a at least partially encapsulated by the passivation layer 61, and a first plate 51 partially with electrical-connection to first storage 41 and partially connected to the liquid crystal cell 10. Moreover, the non-volatile electronic display of the present invention further comprises a second plate 52 formed on the inner face of the upper supporting substrate 102. The non-volatile electronic display of the present invention further comprises a fourth barrier layer 34 formed atop the upper supporting substrate 102, a third control electrode (control 3) 23 formed in the fourth barrier layer 34, a third barrier layer 33 formed atop the fourth barrier layer 34, a second storage 42 formed in the third barrier layer 33 and electrically connected to the second plate 52, a second upper control electrode (control 2b) 22b formed atop the third barrier layer 33.

With reference again to FIG. 6A, in the non-volatile electronic display of the present invention, at least one electrical plate 51 (or 52) provides electrical field to the liquid crystal cell 10, which functions as a field controllable light transmissible unit for the non-volatile electronic display. At least one control electrode 21 (or 22a, 22b, 23) charges or discharges the electrical plate 51 (or 52). At least one dielectric layer (namely, the first barrier layer 31, the second barrier layer 32, the third barrier layer 33, or the fourth barrier layer 34) separates the control electrode 21 (or 22a, 22b, 23) with the electrical plate 51 (or 52). The dielectric layer 31 (or 32, 33, 34) has higher intrinsic energy band gap at room temperature than the intrinsic energy band gap of either materials used for the electrical plate 51 (or 52) and the control electrode 21 (or 22a, 22b, 23). Moreover, in the structure shown in FIG. 6A, there is neither semiconductor nor metal directly connecting the control electrode 21 (or 22a, 22b, 23) and the electrical plate 51 (or 52). Any electrical charging or discharging function that the control electrode 21 (or 22a, 22b, 23) performs to the electrical plate 51 (or 52) is through at least one dielectric layer 31 (or 32, 33, 34).

In the above arrangement, the first control electrode (control 1) 21, the second lower control electrode (control 2a) 22a, the second upper control electrode (control 2b) 22b, and the third control electrode (control 3) 23 can be Al or other metals. The first barrier layer 31, the second barrier layer 32, the third barrier layer 33, and the fourth barrier layer 34 can be oxide or other insulators. The first storage 41 and the second storage 42 can be Al, transparent conductive material such as indium tin oxide (ITO), or other metals. The first plate 51 can be transparent conductive material such as ITO. The second plate 52 can be transparent conductive material such as ITO. The passivation layers 61 and 62 can be oxide, nitride or other insulators. Moreover, the second lower control electrode (control 2a) 22a, the second upper control electrode 22b (control 2b) can be connected and encapsulated together inside a passivation material, which can be used to provide mechanical support as a pillar (not shown) between the top and bottom glasses 100 and 102.

The part of the non-volatile electronic display shown in FIG. 6A is connected to gate driver (not shown) and source driver (not shown) through word line WL and bit line BL respectively, which are connected to second lower control electrode (control 2a) 22a and the first control electrode (control 1) 21, and to the second upper control electrode (control 2b) 22b and the third control electrode (control 3) 23 respectively. By biasing the voltage of the first control electrode (control 1) 21 to be larger than the voltage of the second lower control electrode 22a (V21>V22a, namely, V(control 1)>V(control 2a)), the electrical carriers (such as electron) can tunnel through the second barrier layer 32 from second lower control electrode (control 2a) 22a to the first storage 41/first plate 51 and get trapped there. Moreover, by biasing voltage of the second upper control electrode (control 2b) 22b to be similar to that of the second lower control electrode 22a (control 2a) and biasing the voltage of the second upper control electrode (control 2b) 22b to be larger than the voltage of the third control electrode (control 3) 23 (V21>V22a~V22b>V23, namely, V(control 1)>V(control 2a)~V(control 2b)>V(control 3)), the electron can tunnel through the fourth barrier layer 34 from the third control electrode (control 3) 23 to the second storage 42/second plate 52 and get trapped there. Those electrons set the potential of the first plate 51 and the second plate 52 to provide the electrical field. Therefore, electrical field can be supplied to the liquid crystal cell 10 to sustain the displayed image, even the external powers or signals are no longer applied to the non-volatile electronic display of the present invention. Similar as the above description, the de-trapping mechanism is simply the opposite operation of the trapping. Note again that here we use such biasing scheme and electron tunneling as examples while other similar bias scheme modification or using hole tunneling should become obvious after reading this disclosure for people who skilled in this art. The detailed setting/resetting mechanism can be varied, but the basic capacitive-coupled idea should be remained.

In fact, the key feature differentiates this invention to prior art is how the electrical charges are programmed/stored into the plate which polarizes the liquid crystal. In prior TFT-LCD implementation, the electrical charges being programmed into the plate have to travel through access transistors which are essentially made of semiconductor materials (Si). Even when the access transistors are turned off, the charges can still leak away or get recombined through/inside the semiconductor material. However, in this invention, the charges have a much tougher path to travel because they have to pass through a much higher electrical potential barrier from the dielectric to enter into the "floating node" region. After passing through the barrier through the help of external bias, once the bias is gone, the charges are isolated by dielectric and have no direct connection to semiconductor or metallic layers to recombine or leak through. In general, if it is easier to program/retrieve charges into/from a storage node, it also means it is harder to keep them there. In other words, prior art might have faster speed to access individual pixel or sub pixel due to easier access to the storage node, but it also means the retention time for the charges are shorter. The current invention could offer longer retention time but might be slower in turns of programming individual pixel or sub pixel. Hence, there is a fundamental trade-off between the prior "DRAM-like" and this "non-volatile like" architecture on the speed/retention time. However, compared to human eyes' perception ability, such delay in pixel access time might not be obviously perceivable, but losing the image is certainly perceivable if the retention time is not long enough. And this is the purpose of this invention to improve the retention issue with minimum cost on the performance.

Since the principle of this invention is by inserting floating nodes to preserve electrical charges, placing them in a vertical stacking order is not the only option. FIGS. 5B and 6B are meant to illustrate the embodiments shown in FIGS. 5A and 6A in block diagrams to manifest only the connection relationship instead of the detailing layering structure. For example, the floating mechanism can still be realized by lateral arrangement, which can be derived from FIGS. 5B and 6B.

Moreover, to broadly apply the principle of this invention, other peripheral/supplementary elements such as color filters and mechanical frame (even though not discussed in detail here) should be obvious modification once the floating node storage mechanism is disclosed by this invention. For example, for color display, one can just use three of these floating gate cells in conjunction with red/green/blue color filters to represent red/green/blue sub pixels.

In summary, a capacitive-coupled version of electronic display is proposed. In analogy to the memory family, this invention can be viewed as the SRAM or even non-volatile version display while the previous display can be viewed as the DRAM version. The detailed device structure (ex: thickness, layer coverage or material) and biasing scheme could be varied depends on the applications, but the capacitive-coupled concept using floating node to preserve charges to provide longer retention time, instead of the conventional transistor-coupled implementation which is leakier with shorter retention time, should be viewed as the key of this disclosure and applied to other modification based on this concept.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A non-volatile electronic display, comprising
    a light valve plate comprising a plurality of field controllable light transmissible units arranged in matrix fashion and placed atop a transparent substrate;
    a plurality of non-volatile memories formed on the transparent substrate, each of the non-volatile memories arranged corresponding to one field controllable light transmissible unit;
    a plurality of word lines and a plurality of bit lines connected to the plurality of non-volatile memories and supplying signal to store charge to at least one non-volatile memory;
    wherein charge is retained in the at least one non-volatile memory when no external power is applied to the non-volatile electronic display.

2. The non-volatile electronic display in claim 1, wherein the material of the field controllable light transmissible units includes liquid crystal.

3. The non-volatile electronic display in claim 2, wherein the transparent substrate is a lower supporting substrate and the non-volatile electronic display further comprises an upper supporting substrate to sandwich the liquid crystal plate therein with the lower supporting substrate.

4. The non-volatile electronic display in claim 2, wherein each of the non-volatile memories comprises a first barrier layer formed in adjacent to the transparent substrate, a first control electrode partially encapsulated by the first barrier layer, a second barrier layer formed in adjacent to the first barrier layer, a first storage which is separated from both first control electrode and second lower control electrode by dielectric layers, and a second lower control electrode formed in adjacent to the second barrier layer.

5. The non-volatile electronic display in claim 4, wherein a substantial voltage difference between the first control electrode and the second lower control electrode is used to provide electrical carrier transfer in between the first control electrode and the second lower control electrode wherein during the transfer, part of the electrical carriers are trapped inside the first storage node to establish electric field across the liquid crystal cell corresponding to the non-volatile memory.

6. The non-volatile electronic display in claim 4, wherein the first storage including nano-crystal inside the dielectric layer to capture part of the tunneling electrical carriers.

7. The non-volatile electronic display in claim 4, wherein the first and second barrier layers are formed by low temperature plasma-enhanced oxidation or deposition.

8. A non-volatile electronic display, comprising:
   a lower supporting substrate and an upper supporting substrate separated with the lower supporting substrate;
   a light valve plate comprising a plurality of liquid crystal cells arranged in matrix fashion atop the lower supporting substrate;
   a plurality of non-volatile memories formed on the lower supporting substrate and the upper supporting substrate, each of the non-volatile memories arranged corresponding to one liquid crystal cell;
   a plurality of word lines and a plurality of bit lines connected to the plurality of non-volatile memories and supplying signal to store charges to at least two non-volatile memories on two opposites of one liquid crystal cell;
   wherein the charges are retained in the at least two non-volatile memories when no external power is applied to the non-volatile electronic display.

9. The non-volatile electronic display in claim 8, wherein each of the non-volatile memories on the lower supporting substrate comprises a first barrier layer formed in adjacent to the lower supporting substrate, a first control electrode partially encapsulated by the first barrier layer, a second barrier layer formed in adjacent to the first barrier layer, a first storage which is separated from both first control electrode and second lower control electrode by dielectric and said first storage can provide static electrical field to the liquid crystal, and a second lower control electrode formed in adjacent to the second barrier layer.

10. The non-volatile electronic display in claim 9, wherein each of the non-volatile memories on the upper supporting substrate comprises a fourth barrier layer formed in adjacent to the upper supporting substrate, a third control electrode partially encapsulated by the fourth barrier layer, a third barrier layer formed in adjacent to the fourth barrier layer, a second storage which is separated from both third control electrode and second upper control electrode by dielectric layers and said second storage can provide static electrical field to the liquid crystal, and a second upper control electrode formed in adjacent to the third barrier layer.

11. The non-volatile electronic display in claim 10, wherein the second lower control electrode and the second upper control electrode are connected and encapsulated together inside a passivation material.

12. The non-volatile electronic display in claim 9, wherein a substantial voltage difference between the first control electrode and the second lower control electrode is used to provide electrical carrier transfer between the first control electrode and the second lower control electrode wherein during the transfer, part of the carriers are trapped inside the first storage to establish electrical field across the liquid crystal cell corresponding to the non-volatile memory.

13. The non-volatile electronic display in claim 10, wherein a substantial voltage difference between the third control electrode and the second upper control electrode is used to provide electrical carrier transfer between the third control electrode and the second upper control electrode wherein during the transfer, part of the carriers are trapped inside the second storage to establish electric field across the liquid crystal cell corresponding to the non-volatile memory.

14. The non-volatile electronic display in claim 9, wherein the first storage includes nano-crystals inside dielectric layer to trap part of the electrical carriers.

15. The non-volatile electronic display in claim 10, wherein the second storage includes nano-crystals inside dielectric layer to trap part of the electrical carriers.

16. The non-volatile electronic display in claim 9, where the first and second barrier layers are formed by low temperature plasma-enhanced oxidation or deposition.

17. The non-volatile electronic display in claim 10, wherein the third and fourth barrier layers are formed by low temperature plasma-enhanced oxidation or deposition.

18. A capacitive coupled non-volatile electronic display cell, including:
   at least one electrical plate which provides electrical field to a field controllable light transmissible unit;
   at least one control electrode which charges or discharges said electrical plate;
   at least one dielectric layer separating said control electrode and said electrical plate, and said dielectric layer has higher intrinsic energy band gap at room temperature than intrinsic energy band gap of either materials used for said electrical plate and said control electrode,
   wherein there is neither semiconductor nor metal directly connecting said control electrode and said electrical plate, and electrical charging or discharging function that said control electrode performs to said electrical plate is through at least one said dielectric layer.

19. The non-volatile electronic display cell in claim 18, wherein the material of field controllable light transmissible units includes liquid crystal.

20. The non-volatile electronic display cell in claim 18, wherein the dielectric layer separating control electrode and electrical plate is formed by low temperature plasma-enhanced oxidation or deposition.

* * * * *